(12) United States Patent
Van Zanten (10) Patent No.: US 7,263,799 B2
(45) Date of Patent: Sep. 4, 2007

(54) PLANT BASE

(75) Inventor: Evert Van Zanten, Maasdijk (NL)

(73) Assignee: E. Van Zanten Holding B.V., Naaldwijk (NL)

( * ) Notice: Subject to any disclaimer, the term of this patent is extended or adjusted under 35 U.S.C. 154(b) by 167 days.

(21) Appl. No.: 10/869,311

(22) Filed: Jun. 16, 2004

(65) Prior Publication Data

US 2005/0028439 A1 Feb. 10, 2005

(30) Foreign Application Priority Data

Jun. 17, 2003 (NL) .................................. 1023678
May 24, 2004 (NL) .................................. 1026254

(51) Int. Cl.
*A47G 7/00* (2006.01)
*B65G 29/00* (2006.01)
*B60P 3/00* (2006.01)

(52) U.S. Cl. ...................... 47/39; 47/65; 47/17; 47/18; 198/867.13; 198/795; 198/465.2; 206/562

(58) Field of Classification Search ............. 198/465.2, 198/465.3, 795, 867.13; 47/39, 71, 63, 65, 47/65.5, 1.01 P, 17, 18, 66.3, 66.7, 66.1, 47/41.01, 19.1, 25.1, 66.4, 66.6, 416.08; 414/416.08; 248/128, 27.8, 311.2, 314; 206/557, 562, 563, 565; D7/553.1, 550.1, D7/566; 220/575, 23.4; 211/85.23, 88.03, 211/49.1; A01G 31/04, 7/02
See application file for complete search history.

(56) References Cited

U.S. PATENT DOCUMENTS

| 2,019,249 A | 10/1935 | Bradley |
| 2,740,515 A * | 4/1956 | Wilson ........................ 198/633 |
| 4,248,014 A | 2/1981 | Williames |
| D290,919 S * | 7/1987 | Beute ........................... D7/543 |
| 4,863,134 A * | 9/1989 | Young et al. ............ 248/311.2 |
| 4,969,290 A | 11/1990 | Skoretz |
| 5,220,744 A * | 6/1993 | Kendall .......................... 47/39 |
| 5,395,081 A * | 3/1995 | Vollink .................... 248/218.4 |
| 5,457,911 A * | 10/1995 | Vollink ........................... 47/67 |
| 5,878,527 A * | 3/1999 | Valstar ....................... 47/62 C |
| 6,305,532 B1 * | 10/2001 | Overkamp .................. 206/217 |

(Continued)

FOREIGN PATENT DOCUMENTS

EP 0 688 012 A1 8/1995

(Continued)

*Primary Examiner*—Andrea M. Valenti
(74) *Attorney, Agent, or Firm*—The Webb Law Firm (57) ABSTRACT

The invention provides a plant base comprising a base section with a seat for a plant pot, in which a tail section extends in a horizontal direction from the rear of the base section. A groove/protuberance combination is provided at the front of the base section and the rear of the tail section that is able to be accommodated in the groove of another corresponding plant base. The groove and the protuberance each has a support surface that is lower or higher than the support surface of the groove, such that when the protuberance of the plant base has been taken up in the groove of the other plant base, one of the two plant bases is lifted from the substrate at the location of the engaging protuberance and groove. Thus, the invention provides a plant base that continuously retains the same orientation during transport over a conveyor belt, with successive plant bases kept a sufficient distance apart.

6 Claims, 5 Drawing Sheets

U.S. PATENT DOCUMENTS

| | | | |
|---|---|---|---|
| D453,891 S * | 2/2002 | Sussman | D7/553.1 |
| 6,494,420 B2 * | 12/2002 | Lucero | 248/129 |
| D469,310 S * | 1/2003 | Bukowski | D7/553.1 |
| D481,592 S * | 11/2003 | Bulcher et al. | D7/553.1 |
| 6,843,021 B1 * | 1/2005 | Huang | 47/63 |
| 2003/0070357 A1 * | 4/2003 | Huang | 47/66.3 |
| 2005/0160668 A1 * | 7/2005 | Van Zanten | 47/39 |

FOREIGN PATENT DOCUMENTS

| | | | |
|---|---|---|---|
| EP | 1488687 A1 * | 6/2004 | |
| EP | 1488688 A1 * | 6/2004 | |
| FR | 2 519 246 A | 7/1983 | |
| JP | 2002247920 A * | 9/2002 | |
| NL | 8502285 A | 3/1987 | |

* cited by examiner

PLANT BASE

BACKGROUND OF THE INVENTION

The present invention relates to a plant base comprising a base section with a seat for a plant pot, the plant base furthermore comprising a tail section that extends in the horizontal direction from a rear of the base section. The present invention also relates to a combination comprising at least one such plant base and a conveyor system with side walls.

The field of application will be, in particular, in horticulture, also including multiplication, plant breeding, cultivation, trade in such products, etc. More specifically, the plant base will be used in those activities in horticulture where a conveyor system is used.

SUMMARY OF THE INVENTION

One of the aims of the plant base mentioned in the preamble is that the plant base continuously retains the same orientation during transport. This is achieved in that the base section or tail section collides with the side walls of the conveyor system during transport, during which collision the base section and the tail section joined thereto will rotate just until the tail section becomes essentially parallel to the side wall and thus also parallel to the direction of transport, where the tail section will extend from the base section in a direction opposed to the direction of transport. If the plant base is moved from the one conveyor belt to another conveyor belt, which, for example, is provided perpendicularly thereto, this process will be repeated until the orientation of the plant base has been adapted to the new direction of transport. During this operation use can optionally be made of a special guide member, such as a guide strip, that is provided at a certain angle with respect to the conveyor belt and prevents too substantial sudden rotations of the plant base.

The tail section thus ensures that the plant base continuously assumes the same orientation with respect to the direction of transport. This direction-seeking aspect is advantageous in the case of treatment operations on a plant, or a flower, where only one side of the plant or the flower has to be treated. Furthermore, consideration can be given to stronger illumination of one side of a plant or a crop, where there are the most fruits or flowers. 'Continuously assuming the same orientation with respect to the direction of transport' furthermore has the advantage that the orientation of the plant placed in the plant pot with respect to the light can be controlled and manipulated.

A second aim of the invention is that successive plant bases are kept a certain distance apart. Together with the direction-seeking function of the tail section, as described in the previous paragraph, during transport of a series of plant bases positioned next to one another, the tail section of a plant base at the rear thereof will be in contact with the base section of a following plant base. As a result, two plant bases located next to one another will continuously be held apart by a distance that is at least equal to the length of the tail section.

One advantage here is that plants located next to one another are no longer able to become entangled with one another and thus are no longer able to damage one another. This is important in particular in the case of plants that spread beyond the diameter of the associated plant pot.

A third advantage of the plant base mentioned in the preamble is that the tail section provides additional stabilisation for the plant base to prevent the plant pot associated with the plant base from falling over. In particular, this is the case if the tail section is provided just above or even in contact with the conveyor belt. This will be of importance especially in the case of relatively tall crops or plants, or at least crops or plants with a high centre of gravity, when, for example, treatments are carried out on the upper part thereof.

DETAILED DESCRIPTION OF THE PREFERRED EMBODIMENTS

In an advantageous embodiment of the plant base according to the invention, a groove/protuberance combination is provided at the front of the base section and the rear of the tail section, the protuberance on the plant base being able to be accommodated in the groove of a further corresponding plant base, the groove and the protuberance each having a support surface, the support surface of the protuberance being lower or higher than the support surface of the groove, such that when the protuberance of the plant base has been taken up in the groove of the corresponding further plant base one of the two plant bases is lifted from the substrate at the location of the engaging protuberance and groove.

The advantage of this embodiment is, in particular, important in the case where a row of plant bases is stationary on a conveyor belt moving underneath the plant bases and is supplemented by new plant bases via the conveyor belt. The row can be held stationary on a transport belt moving beneath it by holding back the first plant base in the row, for example against a stop. This situation will arise, for example, when packing plants and making them ready for transport or when manually supplementing a row of plants before these enter further into the conveyor system in their entirety. As a result of lifting one of the two plant bases from the substrate at the location of the engaging protuberance and groove the friction between the (stationary) plant base, on the one hand, and the moving conveyor belt, on the other hand, will be reduced. The advantage of the reduced friction is that the risk of slipping or jamming of the conveyor belt is also reduced. Another advantage is that driving the conveyor belt will cost less energy in such a case.

In another advantageous embodiment of the plant base, the groove or protuberance is provided with a lead-in guide surface on the same side as the support surface of the groove or protuberance, respectively, at the free end of the groove or protuberance, respectively. This embodiment facilitates taking up of the protuberance in the groove and lifting of the one plant base with respect to the other plant base when a plant base moving over a conveyor belt collides with a stationary plant base.

In yet a further advantageous embodiment of the plant base according to the invention, the tail section is provided with one or more supporting feet and the groove/protuberance combination is provided such that the plant base that is to be lifted locally is lifted at the base section. The advantage of the local lifting of the plant base at the base section, which is much heavier than the tail section, is that the effect of the reduced friction between conveyor belt and plant base, as described in the previous paragraph, is much greater. If the supporting feet are positioned so far apart that a conveyor belt can run between them, it is possible to break the entire contact with the conveyor belt when the base section is lifted up and support is provided by the supporting feet. This can also be achieved, for example, if a said supporting foot is provided on the central longitudinal axis of the tail section and a conveyor belt extends on either side of the supporting foot. In both cases the conveyor belt is no longer under load and the plant base is stable and stationary.

By providing the supporting feet at the rear of the tail section, the force required for lifting the relatively heavy base section is reduced. On the other hand, according to the invention it is advantageous to provide one or more supporting feet at the front of the tail section, in particular at the front half of the tail section. Insofar as this is combined with the supporting feet at the rear of the tail section, the front supporting feet will then, in particular, have a greater height. If in this context it is taken into account that the base sect ion of a following plant base always holds the tail section of a preceding plant base pressed down, it is then realised that supporting feet at the front of the tail section provide a see-saw effect that is largely effected by making use of weight already present in the row of plant bases (i.e. the weight of the plants, plant pots and substrate).

According to the invention it is advantageous if, viewed in the longitudinal direction, the length of the tail section is greater than the diameter of the seat. Preferably, the length of the tail section is at least twice as large as the diameter of the seat. With such a difference between the length of the tail section and the diameter of the seat it is ensured that successive plant bases are held an adequate distance apart so that the plants do not become entangled with one another, even in the case of plants of relatively large bulk. Furthermore, the self-aligning aspect is thus reliably ensured.

According to the invention it is furthermore advantageous if, viewed in the direction transverse to the longitudinal direction, the width of the rear end of the tail section is at least 50% of the width of the base section. More preferentially, this width is at least 70%, such as 90% or more, of the width of the base section. The advantage of this construction of the plant base is that the tail section will become parallel to a side wall or a guide member of the conveyor system more rapidly, so that the direction-seeking function of the plant base is improved.

According to the invention it is furthermore advantageous if the bottom of the base section is provided with slits for allowing water to pass through. Such an embodiment offers the facility for providing the plants with water in an ebb and flow system for example while they are on a conveyor belt. In this context consideration can be given to the cultivation and/or transport of the plants in a conveyor channel that can be provided with water. Such a system has been described, for example, in EP 668 012.

According to the invention it is furthermore advantageous if the plant base is provided with an information carrier, such as a magnetic strip or a barcode strip. Preferably, this information carrier can be read remotely, for example because the information carrier is able to receive and send back electrical signals of a characteristic frequency. The use of information carriers offers the facility for automatically differentiating various varieties of plants from one another or automatically differentiating plants which have undergone a different cultivation process. This is, for example, important when packing the plants and making them ready for transport.

According to a further aspect, the invention relates to a combination of a conveyor belt and a plant base according to the invention, wherein the conveyor belt extends along and over a supporting surface, wherein the plant base has one or more supporting feet that are provided in such a way that one or more supporting feet are located alongside the conveyor belt and bear on the support surface. In this way contact between the plant base and the conveyor belt can be broken in a simple manner by lifting the plant base locally such that this comes to bear completely on the supporting feet located alongside the conveyor belt. In this context it is particularly advantageous according to the invention if the conveyor belt has a conveyor belt width and if the plant base has said supporting feet that, viewed transversely to the tail, have a mutual spacing that is greater than the conveyor belt width. However, as already pointed out, it is also possible that the plant base has a central supporting foot and a conveyor belt extends on either side of said supporting foot.

According to yet a further aspect, the present invention relates to a combination comprising:
   a channel with a base and longitudinal side walls;
   a conveyor belt extending over the base of the channel;
   at least two plant bases according to one of claims 1-13;

wherein the tail section of the plant bases has a rear with a central portion and a longitudinal section located on one of the longitudinal sides that extends further to the rear than the central portion, and wherein the front of the base section, the rear of the tail section and the width of the channel are so sized that the front of the base section of a plant base approaching from behind can come alongside the longitudinal section of the plant base located in front of it so as to push said longitudinal section of the front plant base away to the side against the longitudinal side wall of the channel and to hold it pressed against the latter. What is achieved in his way is that the plant bases brace themselves against the longitudinal side walls of the channel, such that the conveyor belt below the plant bases can continue to move forward while the plant bases themselves keep their position. A restraining force exerted on the plant base that is furthest downstream to hold back a complete row of plant bases can thus be kept relatively low. As it were, the restrainer used for holding back only has to exert a restraining force that is sufficient to hold back a single plant base with plant, because the other plant bases brace themselves against the walls of the channel and thus require no or hardly any restraining force on the part of the restrainer.

In this context it is advantageous according to the invention if the plant bases have a longitudinal section extending further to the rear relative to the central portion on both longitudinal sides and if said longitudinal sections, or at least the rear ends thereof, are able to swing outwards in the transverse direction from an initial position against a spring force that tends to swing the longitudinal sections back into the initial position. With this arrangement the ability to swing outwards against the spring force can be achieved by inherent elasticity of the longitudinal sections as well as by attaching the longitudinal sections such that they can pivot and providing them with separate spring means. The advantage of this construction is that the plant bases remain neatly in a row and brace themselves directly opposite one another on either side of the channel, viewed in the transverse direction of the channel.

With a view to 'simplicity of construction' of the plant bases it is, however, advantageous according to the invention if the tail section is made asymmetric with a said longitudinal section only on one longitudinal side, such that the tail section of the plant base braces itself against a channel side wall on one side of the channel, whilst the base section of the plant base approaching from behind braces against the opposite longitudinal side wall of the channel. With this arrangement each plant base, as it were, braces itself obliquely against the longitudinal side walls of the channel.

In the case of a combination according to the invention with a channel provided with longitudinal side walls it is furthermore advantageous according to the invention if at least one of the longitudinal side walls of the channel, in particular both longitudinal side walls, is/are provided with a run-up guide extending along said longitudinal side wall, such that a longitudinal section of the plant base that is pressed against this creeps upwards along said longitudinal side wall. What is achieved in this way is that the contact surface of the plant base with the conveyor belt running underneath it reduces.

According to yet a further aspect, the invention relates to a plant base intended for a channel with longitudinal side walls making up a combination according to the invention.

According to yet a further aspect of the invention, the plant base can be lifted from the substrate locally if the plant base joins a row of plant bases, if a lifting member, with a push end exposed at the front of the base section and a push-off end, is provided at the front of the base section, which lifting member can move with respect to the plant base in such a way that when the push end is subjected to a force acting in the direction of the tail the ling end is driven from an initial position into a lifting position protruding from the plant base at the bottom. A preceding plant base will then operate the lifting member of a plant base approaching from behind by having an effect on the push-off end. As a consequence of this the push end of the lifting member will be driven into a lifting position protruding from the plant base at the bottom and will lift the base section from the substrate. With this arrangement the lifting member is, in particular, elongated and preferably straight. With this arrangement the lifting member can comprise a pin which is inclined in the forward direction and is accommodated such that it can slide in a drilled hole with an opening opening forwards at the front of the plant base and an opening opening downwards at the bottom of the plant base, the length of the pin being greater than the length of the drilled hole. With this arrangement the pin and the drilled hole will in particular run at an angle of less than 45° with respect to the horizontal, such as at an angle of 30° with respect to the horizontal. However, the angle can also be greater than 45° so that a plant base that has been lifted will drop back more easily in order to be able to bring the row of plant bases into motion again. However, it is also possible that the lifting member comprises a lever attached to the plant base such that it can pivot.

According to yet a further aspect the present invention relates to a combination comprising a conveyor track and at least one plant base according to one of claims 1-13 or 21-25, wherein, on the one hand, the conveyor track is provided with a longitudinal guide slot or longitudinal guide rib and, on the other hand, the at least one plant base is provided with a guide projection or guide slot, respectively, which engages in a guiding manner with the longitudinal guide slot or longitudinal guide rib, respectively, of the conveyor track. The aim 'that the plant base continuously retains the same orientation during transport' mentioned in the preamble can also be achieved by providing the conveyor track and the at least one plant base with a slot/projection combination that interacts with one another. It will be clear that this, as such, is independent of the tail section—according to this aspect of the invention the tail section can thus be entirely lacking or, in other words, have a length of 0 cm—and also that this can advantageously be employed in combination with the so-called tail section. In combination with the so-called tail section it is advantageous that such a slot/projection combination appreciably reduces the risk of the plant base becoming stuck at some point. If this aspect is seen in combination with the so-called tail section, it is, for example, advantageous to provide the conveyor track with a longitudinal guide slot and to provide a guide projection in the form of a round pin on the base section, for example in the centre of the base section or at the front of the base section. The pin then ensures that the plant base holds its course at the front, whilst the tail section at the rear ensures alignment of the plant base in the direction of transport.

In the case of a conveyor track with longitudinal guide slot and guide projections provided on the bottom of the plant base it is, for example, conceivable that a drive member, such as a chain, is provided in the longitudinal guide slot, which drive member can engage on the guide projection and, in addition, then to match the drive member and the guide projection to one another in such a way that when the plant base is lifted a little at the location of the guide projection the guide projection becomes disengaged from the drive member. It is then possible to have recourse to a wide variety of types of lifting mechanisms for the lifting mechanism, such as those that have been explained in this application, for example. For example, it is possible to provide a so-called groove/protuberance combination on the plant base and also to provide longitudinal side walls of the conveyor track with run-up guides and—as explained—to make the plant base in such a way that this can be lifted upwards along the run-up guides.

With this 'slot/projection combination' aspect of the invention it is advantageous if the conveyor track has a conveyor belt on either side of the longitudinal guide slot or longitudinal guide rib, respectively. However, it is also very readily possible that the conveyor track has two of said longitudinal guide slots or longitudinal guide ribs, respectively, with a conveyor belt between them.

With this slot/guide projection combination aspect of the invention it is furthermore advantageous if the combination has at least two of said plant bases.

If the tail section—that plays a role in other aspects of the invention—is dispensed with—or has a length of 0 cm—, the rear of the base section will then, as it were, form the tail section. If, in the case of this embodiment, tail section is always read as 'rear of the base section', it will then be clear how all claims in which the tail section is mentioned can be read in respect of this latter aspect if there is no tail section.

The above makes it clear that the present invention and the various embodiments can, inter alia, be classified as follows:

plant bases with tail section (in particular claim 1), with:
  groove/protuberance combination (in particular claims 2-4), with:
    supporting feet (in particular claims 5-7, 15-16) and/or
    tail section dimensions (in particular claims 8-10); and/or
    special features of plant base (in particular claims 11-13); and/or
    guide slot/projection combination (in particular claims 26-29); and/or
  pushing away against the walls of the conveyor track (in particular claims 17-20); with:
    supporting feet (in particular claims 5-7, 15-16) and/or
    tail section dimensions (in particular claims 8-10); and/or
    special features of plant base (in particular claims 11-13); and/or
    guide slot/projection combination (in particular claims 26-29); and/or movable lifting member (in particular claims 22-25); with:
   supporting feet (in particular claims 5-7, 15-16) and/or
   tail section dimensions (in particular claims 8-10); and/or
   special features of plant base (in particular claims 11-13); and/or
   guide slot/projection combination (in particular claims 26-29).
plant bases without tail section (in particular claims 30-31) and with guide slot/projection combination (in particular claims 26-29), with:
   groove/protuberance combination (in particular claims 2-4), with:
      supporting feet (in particular claims 5-7, 15-16) and/or
      special features of plant base (in particular claims 11-13); and/or
   pushing away against the walls of the conveyor track (in particular claims 17-20); with:
      supporting feet (in particular claims 5-7, 15-16) and/or
      special features of plant base (in particular claims 11-13); and/or
   movable lifting member (in particular claims 22-25); with
      supporting feet (in particular claims 5-7, 15-16) and/or
      special features of plant base (in particular claims 11-13).

With regard to the abovementioned class 'plant bases without tail section' it is pointed out that according to the invention the guide slot/projection combination can be dispensed with in this class if the plant base has a non-round peripheral shape and is brought into a conveyor track with upright side walls/guides with a mutual spacing such that a non-round plant base located between them is prevented from rotating by the side walls.

BRIEF DESCRIPTION OF THE DRAWINGS

The invention will be explained below with reference to the appended figures, in which:

FIG. 4 shows a plan view (FIG. 4a) and a side view (FIG. 4b) of a combination of a conveyor track and plant base according to a further embodiment of the invention;

FIG. 5 shows a plan view (FIG. 5a) and a side view (FIG. 5b) of a combination of a conveyor track and a plant base according to yet a further variant of the invention;

FIG. 6 shows a plan view (FIG. 6a) and a side view (FIG. 6b) of a plant base according to yet a further variant of the invention; and FIG. 7 shows a highly diagrammatic plan view (FIG. 7a) and a longitudinal sectional view (FIG. 7b) of a combination of a conveyor track and a plant base according to yet a further variant of the invention.

Figures 1, 2:
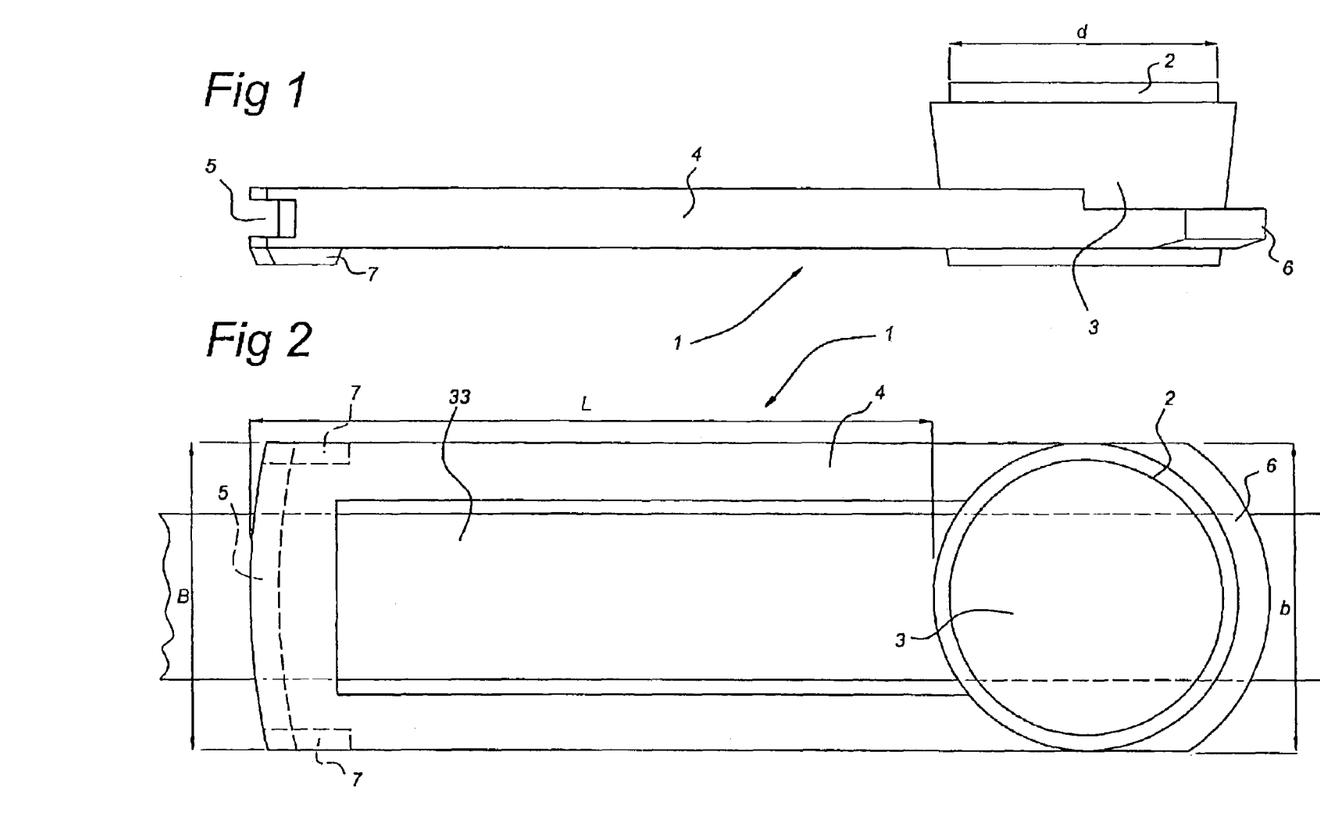
FIG. 1 shows a side view of the plant base in a preferred embodiment.
FIG. 2 shows a plan view of the plant base in a preferred embodiment.

FIGS. 1 and 2 show a plant base in a preferred embodiment according to the invention, where the plant base comprises a base section 3 and a tail section 4, the tail section extending from a rear of the base section 3 in the horizontal direction. Furthermore, a seat 2 for a plant pot, a groove 5 provided at the rear of the tail section 4 and a protuberance 6 provided at the front of the base section 3 can be seen.

The seat 2 of the plant base 1 can be of a design known per se, such as a raised rim or a recess in the base section, in which a plant pot can be accommodated. Preferably, the protuberance 6 is provided on the base section 3 and the groove 5 is provided on the tail section 4. However, it is also readily conceivable to provide the groove 5 on the base section 3 and to provide the protuberance 6 on the tail section.

Supporting feet 7 are provided at the rear of the tail section 4. This offers two advantages. The first is that in this way the contact surface with the underlying surface is reduced. Thus, if this underlying surface is a conveyor belt the friction encountered during slipping will be less. The second advantage is that if the width of the conveyor belt is less than the distance between the supporting feet 7, viewed transversely to the tail, and if the plant base is oriented in the conveyor belt direction, the plant base has no contact at all with the conveyor belt when the base section is lifted. Reference is made to EP 668 012 for an example of conveyor belts that can be used.

Furthermore, FIGS. 1 and 2 show a diameter d of the seat 2 provided at the base section 3, a width B and a length L of the tail section 4 and, finally, a width b of the base section 3.

In the preferred embodiment of the plant base the length L of the tail section 4 is a number of times larger than the diameter d of the seat 2. With such a size, successive plant bases provided with plants will be kept a sufficient distance apart. Even in the case of plants that are relatively broad, the risk of plants next to one another becoming entangled is very low.

Furthermore, in a preferred embodiment of the invention the width B of the rear end of the tail section 4 is preferably at least 90% of the width b of the base section 3. In the embodiment as shown in FIGS. 1 and 2, the width b of the base section 3 is even the same as (100% of) the width B of the tail section 4. If such a plant base has to change direction during transport, the relatively broad tail section will more easily become parallel with a side wall or a guide member of the conveyor system and thus assume the correct direction earlier. A broader tail section 4 therefore improves the direction-seeking capacity of the plant base 1.

FIG. 3 shows the groove/protuberance combination in detail and in side view and serves to illustrate four possibilities for accommodating the protuberance in the groove. In FIGS. 3a and 3b the protuberance 6 is provided on the base section 3 and the groove 5 is provided on the tail section 4. In FIGS. 3c and 3d this is the other way round and, therefore, the protuberance 6 is provided on the tail section 4 and the groove 5 is provided on the base section 3. The possibilities according to FIGS. 3a and 3d are preferred according to the invention, especially in combination with the supporting feet at the rear end of the tail section, which are not shown here.

In addition to the known components from FIGS. 1 and 2, support surfaces 8 and 34 and a run-in guide surface 9 can also be seen in FIG. 3. A characteristic feature of the invention is that the support surface 34 of the protuberance is lower or higher than the support surface 8 of the groove. The run-in guide surface 9 is provided on the same side as the support surface 34. In FIG. 3 the run-in guide surface 9 is provided at the free end of the protuberance 6. It is, however, also readily conceivable that the run-in guide surface 9 is provided at the free end of the groove 5. In fact there are thus 8 possibilities by means of which a groove/ protuberance combination of two successive plant bases can come together. Furthermore, it is pointed out that the support surface 34 can also be at an angle. For example, it can be the extension of run-in guide 9. The transition between run-in guide 9 and support surface 34 can be invisible with this arrangement. The support surface portion will then start where base section or tail section is just lifted up.

Instead of using a run-in guide surface 9 on the protuberance 6, the run-in guide surface could also be provided in the groove 5 in each case. Instead of sloping run-in guide surfaces, run-in guide surfaces running in a curve could also be provided. It is also possible for both the protuberance and the groove to be provided with a run-in guide surface.

Figure 3A:
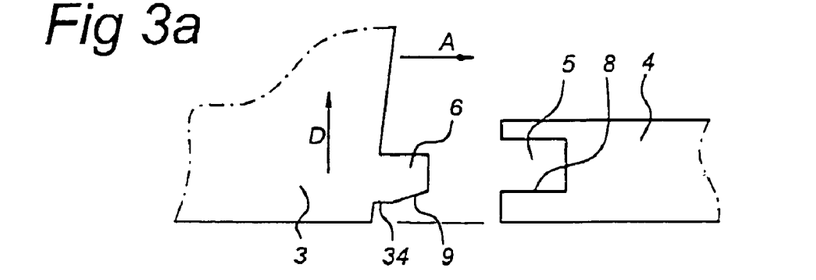
FIG. 3 shows, in a side view and as a detail four possibilities by means of which the groove/protuberance combination of two successive plant bases can drop into one another.

FIG. 3a shows the preferred embodiment of the plant base according to the invention, where the support surface 34 of the protuberance 6 provided on the base section 3 is lower than the support surface 8 of the groove 5 provided on the tail section 4. If the plant base on the left in FIG. 3a moves in the direction indicated by arrow A, the protuberance 6 will be taken up in the groove 5, the base section 3 being lifted slightly from the substrate in a direction indicated by arrow D. In FIG. 3a both support surfaces are at the bottom, that is to say on the underside of the groove and the protuberance, respectively.

Figure 3B:
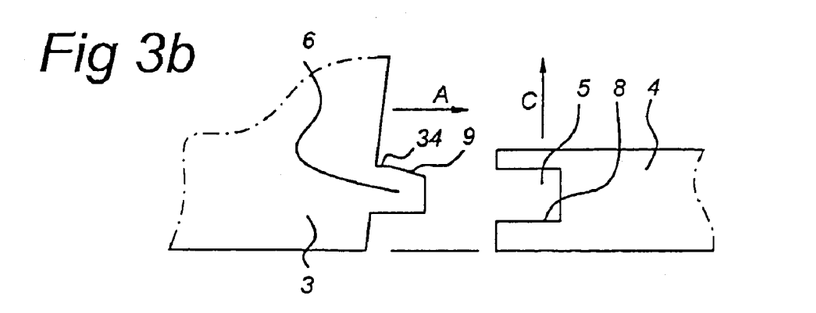

In the embodiment as shown in FIG. 3b, the tail section 4 located on the right-hand side in the figure will be lifted from the substrate in a direction indicated by arrow C. Here the support surfaces 34, 8 are both at the top, that is to say on the top of the groove and the protuberance, respectively. Here support support surface 34 of the protuberance 6 is higher than the support surface 8 of the groove.

Figure 3C:
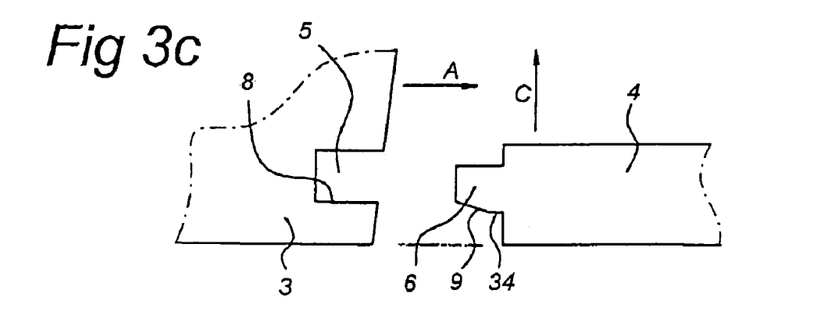
Figure 3D:
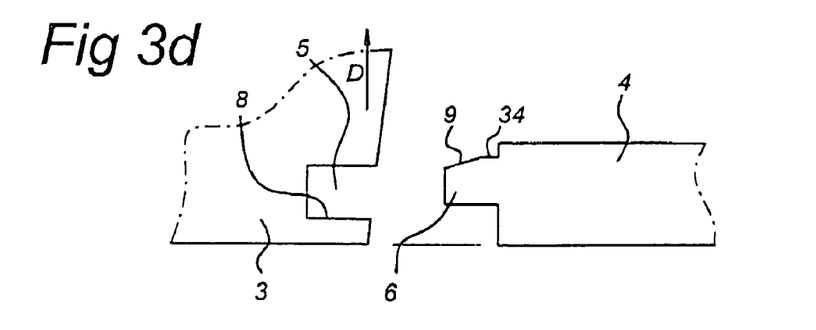

In the embodiments as shown in FIGS. 3c and 3d the location of the groove and the protuberance, respectively, is reversed and, in a manner corresponding to that explained above, the tail section 4 is lifted from the ground (FIG. 3c) in the direction C and the base section 3 is lifted from the ground (FIG. 3d) in the direction D, respectively.

Because, during transport, the tail section 4 will extend in the opposite direction with respect to the direction of transport, in practice the base section 3 moving in the direction A will come together with a stationary or more slowly moving tail section 4.

Figure 4A:
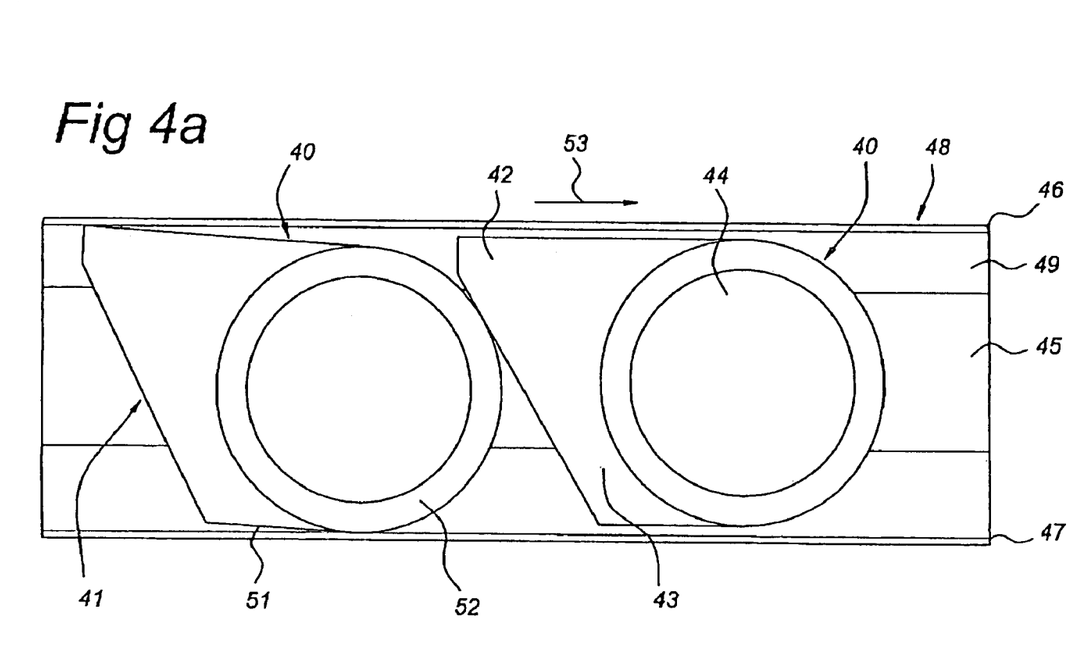
Figure 4B:
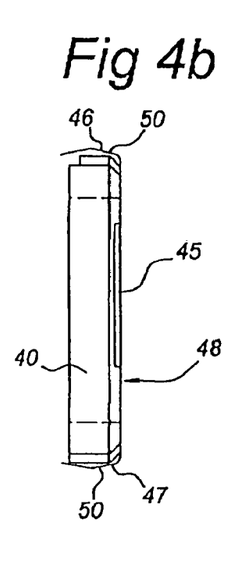

FIGS. 4a and 4b show a plant base 40 and a conveyor track 48. Here the conveyor track 48 is made up of a channel with base 49 and side walls 46, 47. As will be clear to a person skilled in the art after what follows, it is not necessary for the conveyor track to be constructed as a channel. The conveyor track can just as easily comprise a conveyor surface 49 and guides 46, 47 running in the longitudinal direction, without these parts together having to form a channel. For the purposes of moving forward, a conveyor belt 45 also runs over the conveyor surface 49. This conveyor belt 45 can be permanently driven.

The plant base 40 has a tail section 41. This tail section 41 has a central portion 43 and, on one of the longitudinal sides, a longitudinal section 42 that extends further to the rear than the central portion 43. Thus, what can be achieved with suitable sizing of the front of the base section, the rear of the tail section and the width of the channel 48 is that a plant base 40 approaching from behind (on the left in FIG. 4a) pushes the longitudinal section 42 of the plant base 40 in front (on the right in FIG. 4a) against the side wall 46 alongside it. Incidentally, in FIG. 4a the plant base 40 approaching from behind (on the left) is shown in such a position, whilst the plant base 40 in front (on the right) is shown in the continuing transport position. As such this is a situation that can arise in practice, when the plant base 40 in front starts to move further again whilst the plant base 40 located behind it is just not yet moving further.

When the longitudinal section 42 is pushed against the side wall 46 alongside it, the base section 52—in which a recess 44 can be made to accommodate a plant pot—at the opposite longitudinal side 51 will be pushed against the opposite side wall 47. What is achieved in this way is that the plant base 40 braces itself against the opposing side walls 46, 47 and that this is not driven along by the conveyor belt 45 moving in the direction of the arrow 53. The conveyor belt 45 will slip underneath the plant base 40. In order to reduce the friction here it is advantageous according to the invention if the side walls 46, 47 are provided with run-up guides 50 so that the rear of the longitudinal section 42 and the base section 52 are lifted from the conveyor surface 49 by the respective side wall 46, 47. The contact surface with the conveyor belt 45, and thus also the friction therewith, will reduce in this way.

Figure 5A:
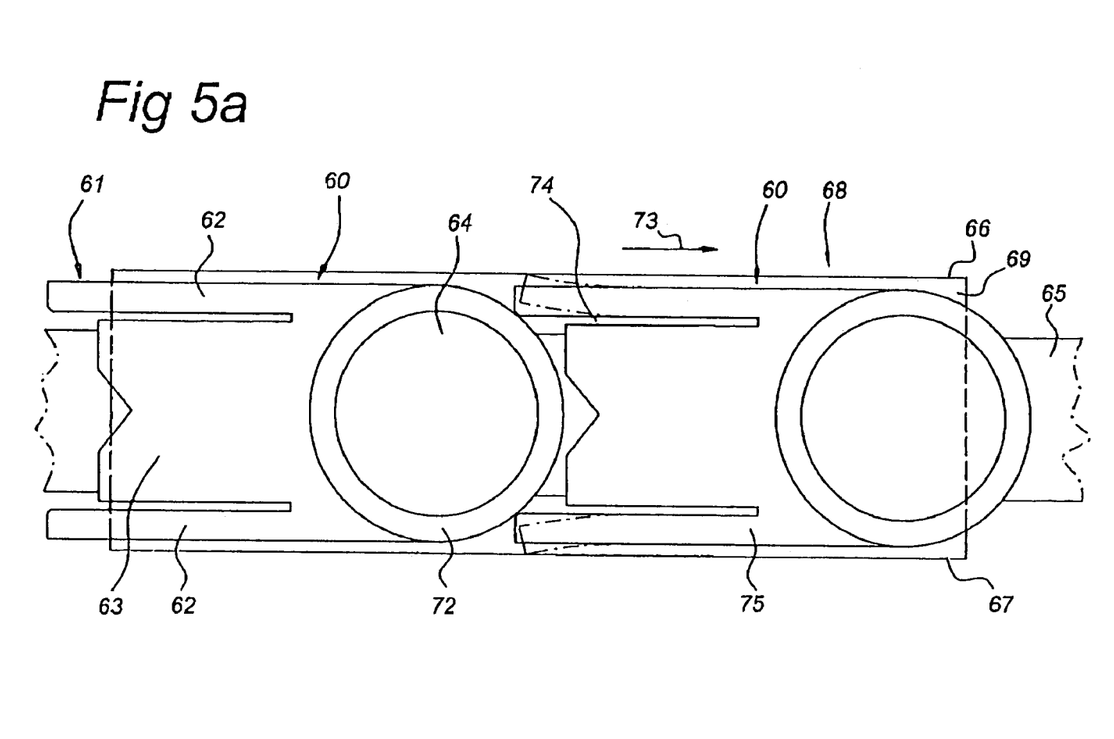
Figure 5B:
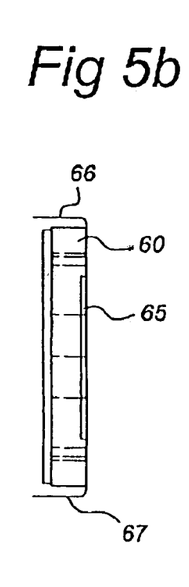

FIG. 5 shows a variant of the embodiment according to FIG. 4. Corresponding components are indicated by a reference numeral corresponding to that in FIG. 4, but increased by 20. The plant base is therefore indicated by 60, etc. The difference between the embodiment according to FIG. 5 and that according to FIG. 4 is that in FIG. 5 the run-up guides in the side walls 66, 67 are missing and that the tail section 61 is made differently. With regard to the missing run-up guides, however, it is pointed out that these can equally well be used in the embodiment according to FIG. 5, just as they could optionally be missing in the embodiment according to FIG. 4.

The difference in tail section 61 lies in the fact that in the embodiment according to FIG. 5 there are two longitudinal sections 62 that extend further to the rear than the central portion 63. Furthermore, the longitudinal sections 62 are separated from the central portion 63 by a slot 74. The longitudinal sections 62 are made flexible by a suitable choice of material, so that, as is indicated for the right-hand plant base 60, they can be pressed against the side walls 66 and 67. Instead of making the longitudinal sections 62 flexible, it is also conceivable that a hinge is provided somewhere at 75 that allows the longitudinal sections 62 to swing outwards, A spring will then also act on this hinge in order to ensure that the longitudinal sections 62 are also able to swing back into their extended position (shown for the left-hand plant base 60) or optionally to a position in which they are swung inwards, resting against the central section 63. The effect achieved with the embodiment according to FIG. 5 is essentially the same as that with the embodiment according to FIG. 4. The advantage here is, however, that the plant bases 60 will remain neatly in line. A further advantage is that the steering effect of the tail section will be equally good both to the right and to the left, so that the plant bases are able to remain neatly straight in line during transport over the conveyor track 68 as well.

Figure 6A:
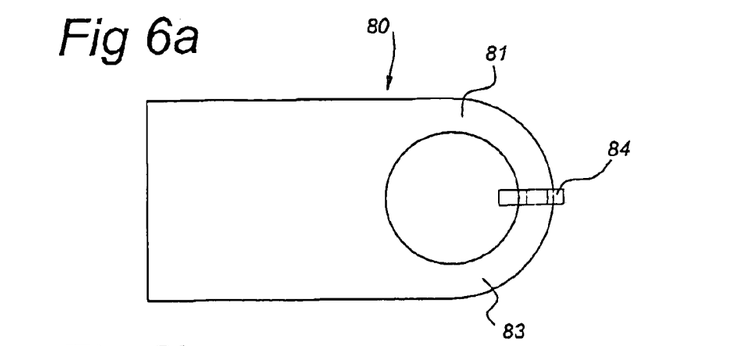
Figure 6B:
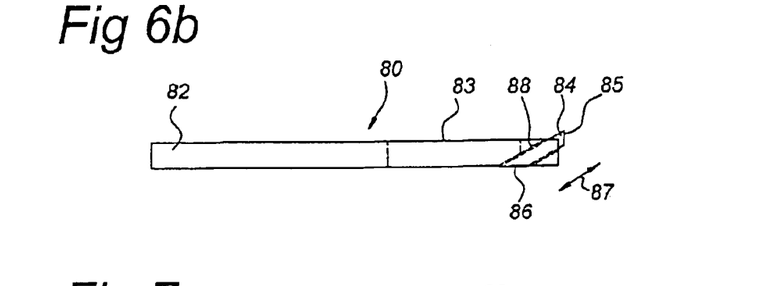

FIGS. 6a and 6b show a further variant of a plant base 80 according to the invention in plan view and side view, respectively. The plant base 80 has a tail section 82 and a base section 83 with a recess 81 for accommodating a plant pot. A movable lifting member 84 is provided at the front of the base section 83. This movable lifting member 84 has a push end 85, exposed at the front of the plant base 80, and a push-off end 86. When the push end 85 of a plant base 80 approaching from behind pushes against the tail section 82 of a plant base in front of it, the lifting member 84, that is able to slide in the passage 88, will be pushed into the passage 88, so that the push-off end 86 emerges at the bottom of the plant base 80. In this way the base section 83 will be lifted from the substrate. In the case of a conveyor track with at least one conveyor belt, it will then be advantageous if this conveyor belt is located eccentrically, such that the push-off end 86 of the lifting member 84 presses directly on the substrate of the conveyor track and not on the conveyor belt itself. Conveyor belts can optionally be provided on either side of the lifting member 84. It is also conceivable that the conveyor belt runs centrally underneath the plant base 80 and that lifting members 84 are provided in the plant base 80 on either side of said conveyor belt. If, as shown in FIG. 6, the front of the plant base 80 is curved in an arc, it is then preferable if the tail section 82 is made with corresponding concave curvature or optionally is provided with a backwards projection at the level of the lifting members 84.

Figure 7A:
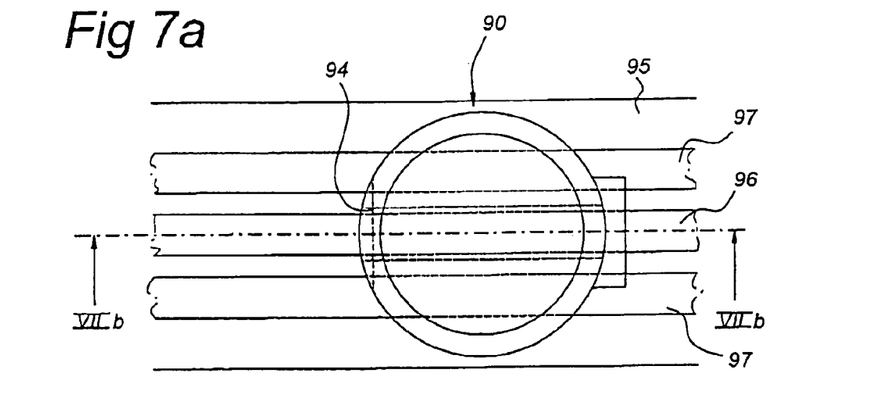
Figure 7B:
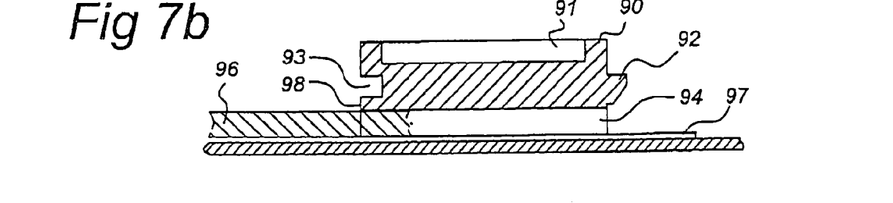

FIG. 7a and FIG. 7b show, diagrammatically, a plan view and longitudinal sectional view, respectively, of a completely round plant base, i.e. a plant base without a tail section, or at least with a tail section that has a length of 0 cm. The round plant base is indicated by 90 and has a recess 91 for accommodating a plant pot. A groove/protuberance combination 92, 93 is provided at the front and rear of the round plant base 90, as has already been explained with reference to FIG. 3. The groove/protuberance combination 92, 93 essentially corresponds to the groove/protuberance combination according to FIG. 3a, but the variants mentioned in the description of FIG. 3 are equally applicable here.

The plant base 90 is provided with a longitudinal slot 94 at the bottom.

FIGS. 7a and b furthermore show a conveyor track 95 on which a longitudinal guide rib 96 is provided centrally. As can be seen in FIG. 7a, the longitudinal guide rib 96 can be accommodated in the longitudinal slot 94 in the bottom of the plant base 90 with the necessary lateral play. What can be achieved in this way is that, when the longitudinal guide rib 96 has a bend, the plant base 90 does not become stuck or otherwise jam in the general sense. Where it has a bend the longitudinal rib 96 can be made somewhat narrower in said bend in order further to counteract this jamming. It is also conceivable that in order to counteract jamming in a bend the longitudinal guide slot 94 is made tapered or widening in some other way at the front and the rear of the plant base 90.

The conveyor track 95 is furthermore provided with two conveyor belts 97. What can be achieved by making the underside of the plant base 90 chamfered upwards at the rear end is that when the front of the plant base is lifted a little—because the protuberance 92 protrudes into a groove in a plant base in front—the entire plant base 90 comes away from the conveyor belts 97. The plant base 90 will then bear on the top of the longitudinal guide projection 96 at 98. This rear 98 will then act as a sort of supporting foot. Incidentally, in this context it will be clear to a person skilled in the art that because the plant base 90, as a consequence of its round shape, automatically already has a rear that extends further backwards than the portion making contact with the conveyor belts 97, the chamfering on the underside of the plant base is not absolutely essential for this coming away from the conveyor belts 97.

It will be immediately apparent to a person skilled in the art that instead of a longitudinal guide rib 96 in the transport part 95, a longitudinal guide slot could also be made and that the guide slot 94 in the bottom of the plant base is then dispensed with and is replaced by one or more guide projections that extend from the underside of the plant base 90 into the longitudinal guide slot in the conveyor track 95. With this arrangement the conveyor belts 97 can then still be used. What can then be achieved by providing a guide projection on the plant base 90 exactly at the rear end of the plant base 90 is that the groove/protuberance combination, as is shown in FIG. 7, is able to lift the plant base 90 in such a way that this comes away from the conveyor belts 97 in its entirety. The guide projection provided at the rear of the plant base 90 then acts as a so-called supporting foot. If the groove/protuberance combination is constructed according to another variant described for FIG. 3, it is optionally possible that the guide projection acting as supporting foot to be provided precisely at the front of the plant base 90. In the general sense, the guide projection acting as supporting foot will be provided at that end of the plant base 90 that precisely is not lifted off the conveyor track. With such an embodiment it will be clear that it is preferable to provide two guide projections, in particular guide projections in the form of round pins. The reason for this is that in this way, on the one hand, the plant base 90 cannot become stuck somewhere on the conveyor track and, on the other hand, because the plant base 90 then always remains neatly on course on the conveyor track. As has also already been described above, it is optionally conceivable that with such an embodiment the conveyor belts 97 are dispensed with and a drive member, such as a chain, that is able to engage with one or more guide projections on the underside of the plant base 90 is provided in the longitudinal guide slot of the conveyor track.

The invention claimed is:

1. A plant base combination, comprising:
   at least two plant bases, wherein each plant base comprises a base section with a seat for a plant pot, and wherein each plant base furthermore includes a tail section that extends in the horizontal direction from a rear of the base section;
   a channel with a base and longitudinal side walls; and
   a conveyor belt extending over the base of the channel;
   wherein the tail section of each of the plant bases has a rear with a central portion and a longitudinal section adjacent the central portion, wherein the longitudinal section extends further to the rear than the central portion, and wherein the front of the base section, the rear of the tail section and the width of the channel are so sized that the front of the base section of the plant base approaching from behind can come alongside the longitudinal section of the plant base located in front of it so as to push said longitudinal section of the front plant base against the longitudinal side wall of the channel and to hold it pressed against said longitudinal side wall.

2. The plant base combination according to claim 1, wherein a plant pot is arranged in the seat of each plant base.

3. The combination according to claim 1, wherein the plant bases have, on both longitudinal side walls, a longitudinal section extending further to the rear relative to the central portion and wherein said longitudinal sections, or at least the rear ends thereof, are able to swing outwards in the transverse direction from an initial position against a spring force that tends to swing the longitudinal sections back into the initial position.

4. The combination according to claim 3, wherein at least one of the longitudinal side walls of the channel is provided with a run-up guide extending along said longitudinal side wall, such that the longitudinal section of the plant base that is pressed against this creeps upward along said longitudinal side wall.

5. The combination according to claim 4, wherein both longitudinal side walls are provided with said run-up guide.

6. A plant base comprising a base section with a seat for a plant pot, wherein the plant base includes a tail section that extends in the horizontal direction from a rear of the base section, combined with a channel and conveyor belt combination of claim 1.

* * * * *